(12) United States Patent
Farooque et al.

(10) Patent No.: US 6,200,696 B1
(45) Date of Patent: Mar. 13, 2001

(54) INTERNAL REFORMING FUEL CELL ASSEMBLY WITH SIMPLIFIED FUEL FEED

(75) Inventors: Mohammad Farooque, Huntington; Lawrence J. Novacco, Brookfield; Jeffrey P. Allen, Naugatuck, all of CT (US)

(73) Assignee: Energy Research Corporation

( * ) Notice: Subject to any disclaimer, the term of this patent is extended or adjusted under 35 U.S.C. 154(b) by 0 days.

(21) Appl. No.: 09/251,196

(22) Filed: Feb. 16, 1999

(51) Int. Cl.[7] .................................................. H01M 8/06
(52) U.S. Cl. .............................. 429/17; 429/20; 422/211; 422/241
(58) Field of Search .................................. 429/17, 19, 20; 422/211, 240, 241, 222

(56) References Cited

U.S. PATENT DOCUMENTS

| 3,488,226 | 1/1970 | Baker et al. |
| 4,647,516 | * 3/1987 | Matsumura et al. ............ 429/19 |
| 4,788,110 | * 11/1988 | Bernard .......................... 429/19 |
| 4,873,155 | 10/1989 | Hirota et al. .................... 429/26 |
| 4,877,693 | 10/1989 | Baker ............................. 429/19 |
| 4,983,470 | * 1/1991 | Kimura et al. ............... 429/19 X |
| 5,175,062 | 12/1992 | Farooque et al. .............. 429/20 |
| 5,426,002 | * 6/1995 | Matsumura et al. ............ 429/20 |
| 5,470,670 | * 11/1995 | Yasumoto et al. .............. 429/20 |
| 5,660,941 | * 8/1997 | Farooque et al. .............. 429/19 |

* cited by examiner

*Primary Examiner*—Stephen Kalafut
(74) *Attorney, Agent, or Firm*—Robin, Blecker & Daley

(57) ABSTRACT

A fuel cell assembly in which fuel cells adapted to internally reform fuel and fuel reformers for reforming fuel are arranged in a fuel cell stack. The fuel inlet ports of the fuel cells and the fuel inlet ports and reformed fuel outlet ports of the fuel reformers are arranged on one face of the fuel cell stack. A manifold sealing encloses this face of the stack and a reformer fuel delivery system is arranged entirely within the region between the manifold and the one face of the stack. The fuel reformer has a foil wrapping and a cover member forming with the foil wrapping an enclosed structure.

33 Claims, 6 Drawing Sheets

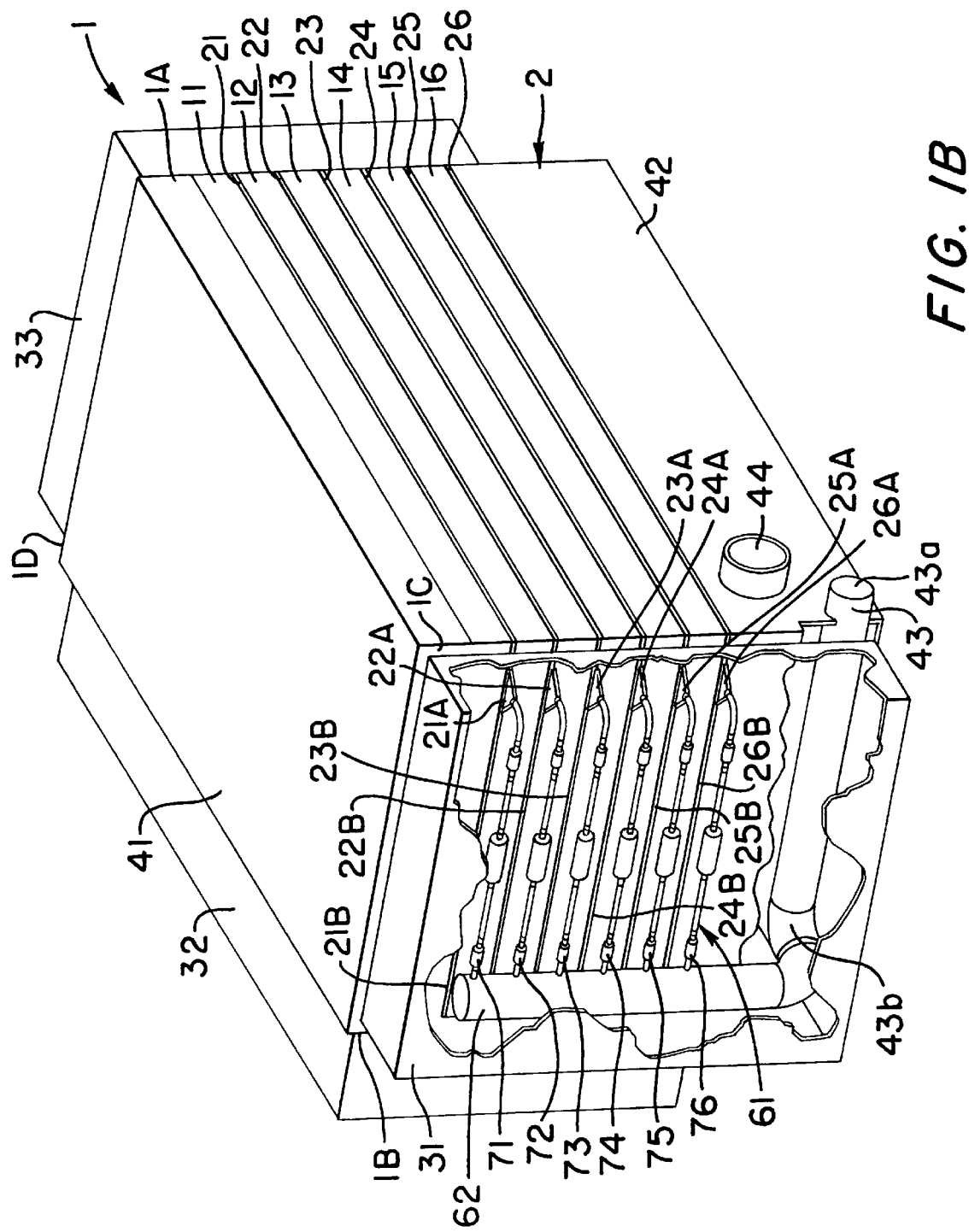

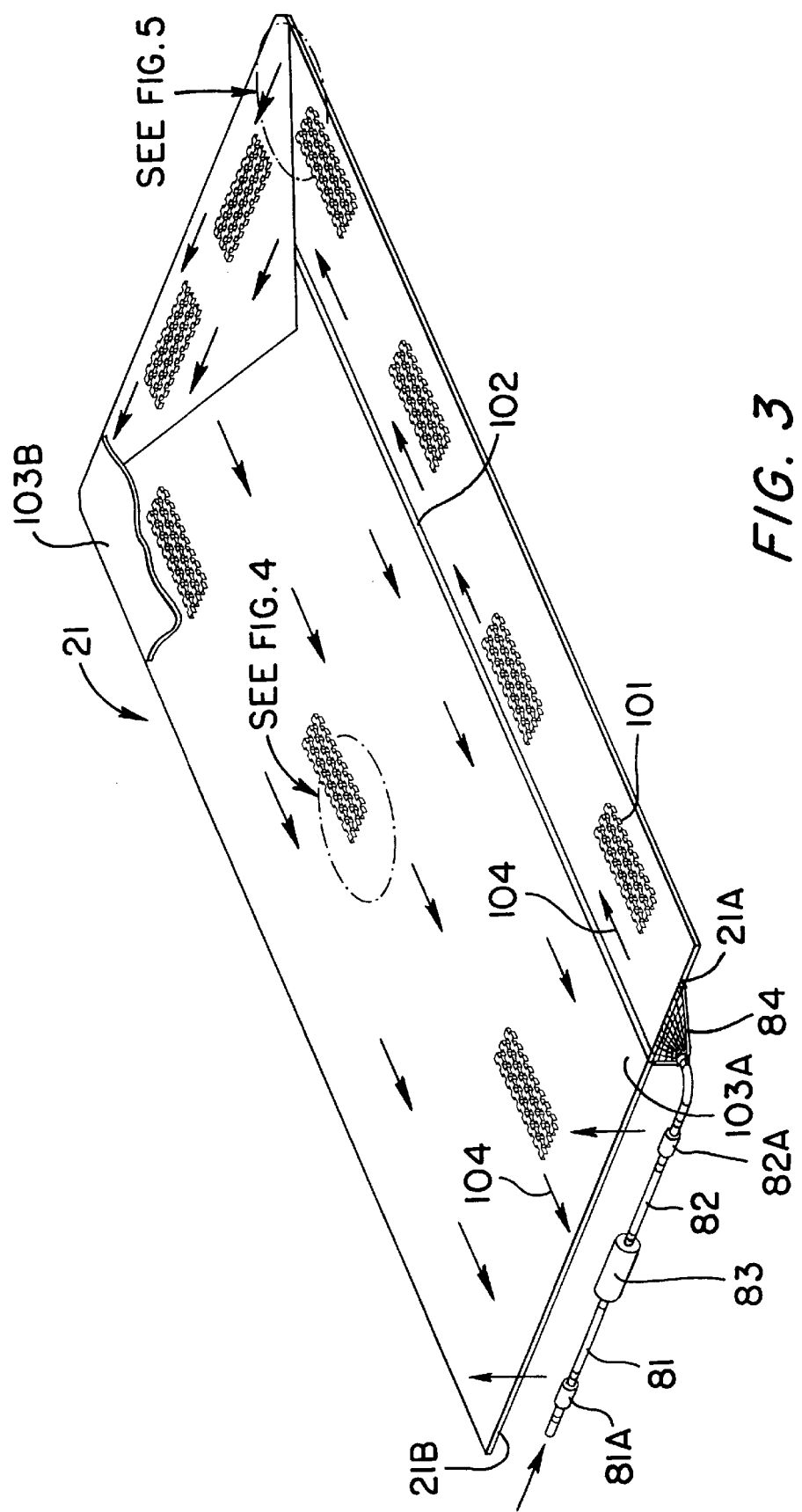

INTERNAL REFORMING FUEL CELL ASSEMBLY WITH SIMPLIFIED FUEL FEED

STATE REGARDING FEDERALLY SPONSORED RESEARCH OR DEVELOPMENT

This invention was made with Government support under Contract No. DE-FC 21-95MC31184 awarded by the U.S. Department of Energy. The Government has certain rights in the invention.

BACKGROUND OF THE INVENTION

This invention relates to fuel cell assemblies and, in particular, to fuel cell assemblies using internal reforming.

So-called direct carbonate fuel cell assemblies are known in which the assemblies convert a hydrocarbon fuel directly to direct current electricity. In these fuel cell assemblies, the fuel is internally reformed to produce hydrogen for fuel cell use. Fuel cell produced water and heat are used by the reforming reactions. The reforming and fuel cell reactions are carried out in thermal and mass transfer communication such that the heat and water produced by the fuel cell are made available in-situ for the reforming reactions.

Two different types of direct fuel cell assemblies have emerged. In the direct internal reforming assembly described in U.S. Pat. No. 3,488,226, reforming catalyst is placed in the anode compartment of each fuel cell directly in communication with the cell environment. In the alternate indirect internal reforming assembly described in U.S. Pat. No. 4,877,693, the bulk of the reforming is carried out internally in reforming units placed in between fuel cell groups in a stack. A group of cells typically might be comprised of five to fifteen fuel cells. The reforming units are in thermal communication with the fuel cells so that the reforming reaction is able to draw the necessary heat from the nearby cells.

A hybrid assembly incorporating both the direct and indirect internal reforming derives the benefits of the direct arrangement (that is high fuel conversion) and the indirect arrangement (longer catalyst life, higher fuel cell performance, and more uniform temperature distribution). In the hybrid assembly, reforming catalysts are placed in the anode compartment of each fuel cell and a reforming plate is placed in between fuel cell groups.

U.S. Pat. No. 5,175,062 describes a reforming unit used for indirect internal reforming and its integration with a direct fuel cell assembly which incorporates a combination of direct and indirect internal reforming. The assembly of the '062 patent has certain disadvantages in reliability and costs which are associated with the fuel supply line connections to the reforming unit.

More particularly, fuel and steam need to be distributed to each of the reforming units. A full-size fuel cell assembly requires 30 to 40 connections for this distribution. In the '062 patent, these connections are made by welding a feed tube to each reforming unit at one end and to a fuel delivery header at the other end. Since the reforming units are electrically live, they must be electrically isolated from the metallic fuel supply header. The '062 patent utilizes dielectric breaks in the feed lines for this purpose.

As can be appreciated, the fuel feed lines of the '062 patent are at the highest pressure with respect to other gas streams. Because of their location external to the fuel cell stack, the entire lines, including their connections at the reforming units and at the dielectric breaks, need to be fully protected against gas leaks for the entire life of the fuel cell assembly. This is made more difficult by the fact that the each feed line connection is subjected to thermo-mechanical stresses during transportation and operation. Therefore, the design of the gas leak protection for the feed lines needs to be very robust to enhance reliability.

The currently available dielectric breaks for voltage isolation of the feed lines comprise ceramic tubes joined with metallic transition pieces, by a brazing process, for ease of connection with the metallic tubes of the feed lines. These types of fittings are expensive and, furthermore, are not rated for the desired >500° C. temperature operation of a carbonate fuel cell assembly, as the brazing compound available for joining the metal feed tube and the ceramic fitting is not stable at these temperatures. Thus, complete gas tightness of these joints throughout the life of the fuel cell assembly is not fully assured.

It is, therefore, an object of the present invention to provide a fuel cell assembly with internal reforming and with improved gas leak protection for the fuel feed lines.

SUMMARY OF THE INVENTION

In accordance with the principles of the present invention, the above and other objectives are realized in a fuel cell assembly in which fuel cells capable of internally reforming fuel and at least one fuel reformer are arranged in a fuel cell stack having a plurality of faces. One face of the fuel cell stack includes the fuel inlet port and reformed fuel outlet port of the fuel gas reformer and the fuel inlet ports of the fuel cells. A manifold is provided to sealingly enclose this one face of the fuel cell stack, and a reformer fuel delivery system for the fuel reformer is arranged entirely within this manifold.

By situating the reformer fuel delivery system within the manifold, if a gas leak occurs, the fuel is contained within the manifold and can still be reformed and utilized in the fuel cells of the assembly. The gas leak protection constraints on the reformer fuel delivery system are thus significantly lessened.

In the fuel cell assembly described hereinbelow, the reformer fuel delivery system includes a fuel supply header and feed lines connecting the header to the individual fuel reformers of the assembly. Each feed line includes first and second spaced feed line sections, one of which connects to the header and the other of which connects to a respective reformer. A ceramic tube connects and bridges the first and second feed line sections and provides electrical isolation for the feed line.

The feed lines are further provided with a fan-like rotatable end or transition duct for coupling the line to the respective fuel reformer. The first and second feed line sections are each provided with a bellows for stress relief.

BRIEF DESCRIPTION OF THE DRAWINGS

The above and other features and aspects of the present invention will become more apparent upon reading the following detail description in conjunction with the accompanying drawings in which:

FIG. 1B illustrates the fuel cell assembly of FIG. 1A with a further partially cutaway portion to show the fuel inlet pipe within the fuel cell assembly end plate;

FIG. 3 shows in greater detail the fuel reformer of the fuel cell assembly of FIG. 1A.

DETAILED DESCRIPTION

Figure 1A:
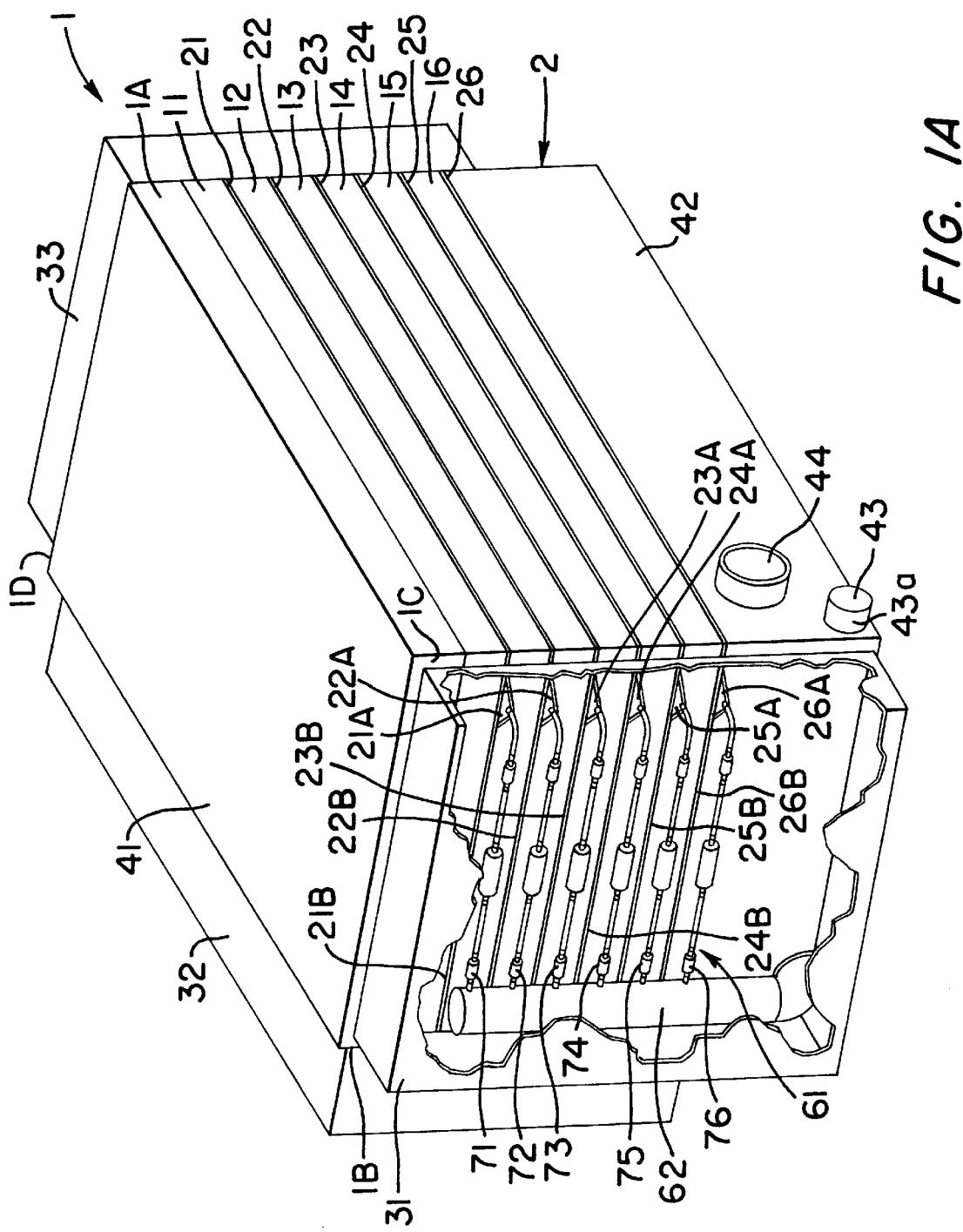
FIG. 1A shows a fuel cell assembly in accordance with the principles of the present invention.

FIG. 1A shows a fuel cell assembly 1 in accordance with the principles of the present invention. The assembly 1 comprises a fuel cell stack 2 having fuel cells arranged in groups of cells identified as groups 11, 12, 13, 14, 15, 16. Each of the groups of cells 11–16 contains a stack of several cells, with a typical number of cells in each group being from 5 to 15 cells.

The fuel cells in the groups of cells 11–16 have oxidant gas inlet ports situated on a first face 1A of the fuel cell stack 1 and have oxidant gas exhaust ports on the opposite face 1B of the stack. Similarly, the fuel cells in the groups of cells 11–16 have fuel inlet ports on another face 1C of the stack 1 and corresponding fuel exhaust ports on the opposing face 1D of the stack.

The fuel cells in the groups of cells 11–16 are, furthermore, capable of themselves internally reforming hydrocarbon fuel passing through the cells into fuel gas. The majority of the fuel gas for the groups of cells, however, is provided by fuel reformers 21, 22, 23, 24, 25, 26 situated in the stack 1 between the groups of cells. These reformers have fuel inlet ports 21A, 22A, 23A, 24A, 25A and 26A on the face 1C of the stack 1 and reformed fuel outlet ports 21B, 22B, 23B, 24B, 25B and 26B also on the stack face 1C.

The fuel assembly 1 further comprises manifolds 31, 32 and 33. The manifolds 32 and 33 gas sealingly enclose the faces 1B and 1D of the stack 1 and receive the oxidant gas exhaust and fuel gas exhaust, respectively. The manifold 31 gas sealingly encloses the face 1C of the stack 1 so that it causes fuel and fuel gas adjacent the face 1C of the stack to enter the fuel inlet ports of the fuel cells and not escape outward of the stack.

The fuel cell assembly 1 further comprises a top end plate 41 and a bottom end plate 42. The bottom end plate supports a fuel inlet pipe 43 and fuel outlet pipe 44.

In accordance with the principles of the present invention, the fuel cell assembly further includes a reformer fuel delivery system 61 for delivering fuel to the reforming units 21–26. In further accord with the invention, the reformer fuel delivery system is disposed entirely within the sealed, enclosed region between the manifold 31 and the face 1C of the stack.

Figure 2:
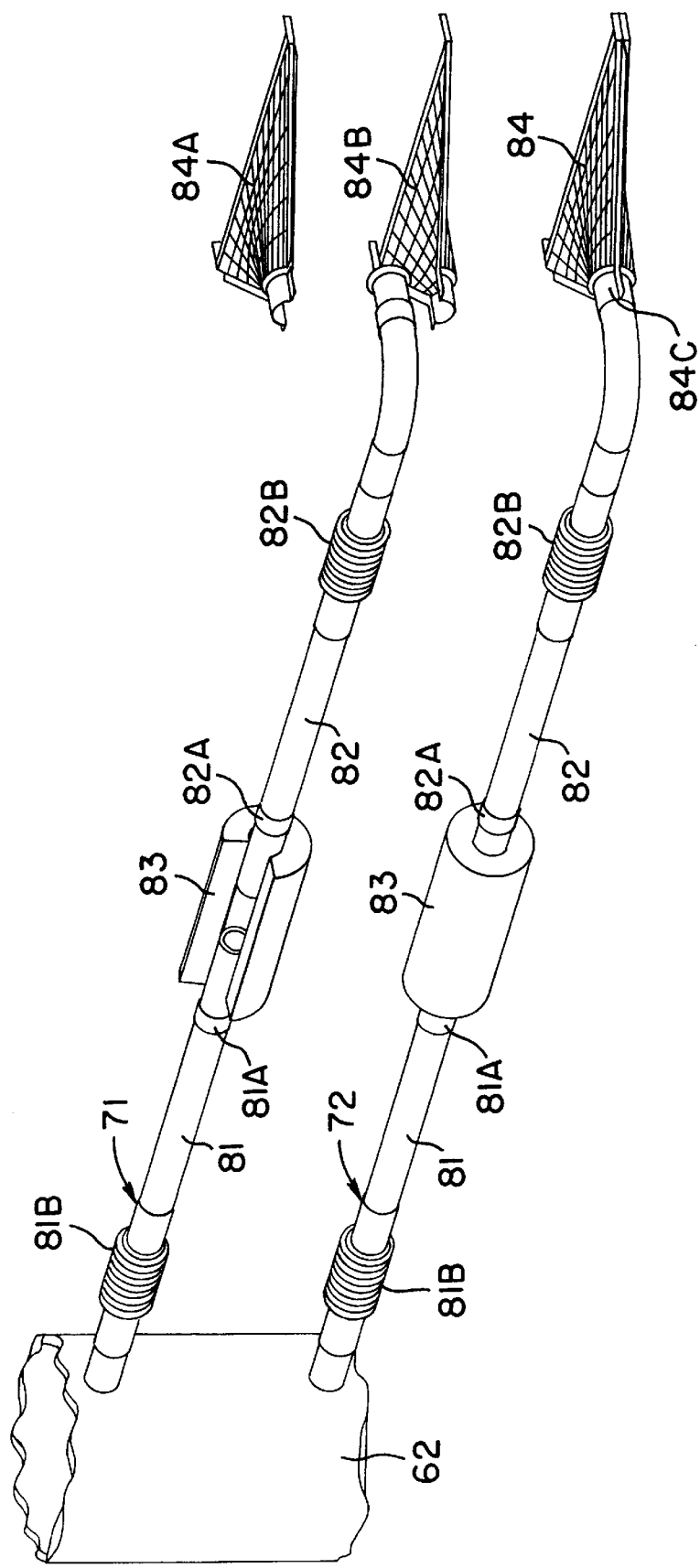
FIG. 2 illustrates in greater detail the reformer fuel delivery system of the fuel cell assembly of FIG. 1A.

As seen in FIG. 1A and in greater detail in FIG. 2, the reformer fuel delivery system comprises a fuel supply header 62 which receives fuel from the fuel inlet pipe 43 carried in the end plate 42. The placement of the fuel inlet pipe 43 within the end plate 42 is illustrated in greater detail in FIG. 1B. As shown, the inlet end 43a of the pipe 43 is adapted to be connected to the fuel feed line (not shown in the figure), while the outlet or exit end 43b is connected to the fuel supply header 62 located within the manifold 31. The header 62 delivers the fuel received from the pipe 43, to feed lines 71, 72, 73, 74, 75 and 76, which, in turn, deliver the fuel to the fuel inlet ports 21A to 26A of the fuel reformers 21–26.

As shown in FIG. 2, the fuel feed lines 71–76 are of the same construction and each includes a first feed line section 81 connected to the header 62, a second feed line section 82 connected to a respective fuel inlet port and spaced from the first feed line section 81 and a dielectric insulator 83. The dielectric insulator bridges the space between the line sections 81 and 82, thereby connecting the line sections in an electrically isolating manner. The first and second feed line sections 81 and 82 further include retainer rings 81A and 82A, respectively, to prevent movement of the dielectric insulator 83. Bellows 81B and 82B are also provided in the line sections 81 and 82, respectively, to better accommodate stack shifting without breaking of the lines.

With this configuration, a fuel mixture containing hydrocarbon fuel and steam is introduced into the fuel pipe 43 in the end plate 42 from the open face 1A of the stack 1 (where there is no manifold). This fuel is then carried by the pipe 43 to the fuel supply header 62 located within the manifold 31. The feed lines 71–76 receive the fuel from the supply header 62 and carry it to the individual fuel reformers 21–26. The individual feed lines 71–76 and fuel supply header 62, as above-noted, are all enclosed within the sealed region between the manifold 31 and the stack face 1C.

As can be appreciated, this arrangement eliminates the need for complete gas sealing of the feed lines 71–76, because any possible fuel leak from the lines is contained within the sealed region created by the manifold 31. Any fuel leaked from the lines will thus be internally reformed in the fuel cells of the fuel cell groups. Since fuel leaks from the feed lines can now be tolerated, the dielectric insulators in the feed lines need not be hermetically sealed to the respective feed line sections, thus reducing the complexity and cost in fabricating the lines.

More particularly, as shown in FIGS. 1A and 2, each dielectric insulator 83 is formed as a simple ceramic tube with an inside diameter matching the outside diameter of the adjoining ends of the feed line sections 81 and 82. The ceramic tube or cylinder is easily slipped over the feed line sections which are preferably formed of metal tubing.

Moreover, the clearance and tolerance of the fit of each ceramic tube 83 on the metal tubes forming the feed line sections 81 and 82 is such that at the operating temperature of the fuel cell assembly, the metal tubes exert a radial force on the inner wall of the ceramic tube, closing the gap and sealing the joint. A strong metal to ceramic joint is thus formed and any fuel leakage therethrough will be minimal. Also, any fuel leakage which occurs will be kept within the sealed region defined by the manifold 31 and reformed by the fuel cells of the fuel cell assembly.

Additionally, by appropriate selection of the metal tubing, the force exerted on the ceramic tube due to differential thermal expansion is kept below that which would fracture the ceramic.

As previously indicated, the feed line sections 81 and 82 of each feed line are also provided with bellows 81B and 82B, respectively. The bellows provide relief for any stress to the line caused by stack height changes during operation of the assembly.

Another benefit of arranging the reformer fuel supply system 61 within the region sealed by the manifold 31 is that the fuel mixture, i.e., fuel and steam, can be introduced into the fuel supply header 62 at a much lower temperature (i.e., a temperature in the range of 490° C. to 540° C.) than the normal operating temperature (i.e., a temperature in the range of 540° C. to 650° C.) of the fuel cells of the fuel cell assembly. The fuel mixture is then preheated within the manifold 31, while flowing through the header and the feed lines. This preheating of the fuel mixture, before entering the fuel reformers, causes it to reach a temperature which is compatible with the operating temperature of the fuel cells of the fuel cell assembly.

Preheating the fuel mixture in this way benefits the overall fuel cell system using the fuel cell assembly 1 in two ways: 1) the fuel preheating load in the superheater or the heat recovery steam generator of the fuel cell system is lowered; and 2) the fuel cell cooling load is lowered by an equal amount. Recent tests of a fuel cell system of this type showed that the heating load of the fuel stream can be lowered by >100° C. and the fuel cell cooling load can be lowered by −20° C. by preheating the fuel mixture inside the manifold 31 as in the present invention.

A detailed view of the fuel reformer 21 is shown in FIG. 3. The reformers 22–26 are of similar construction.

Figure 5:
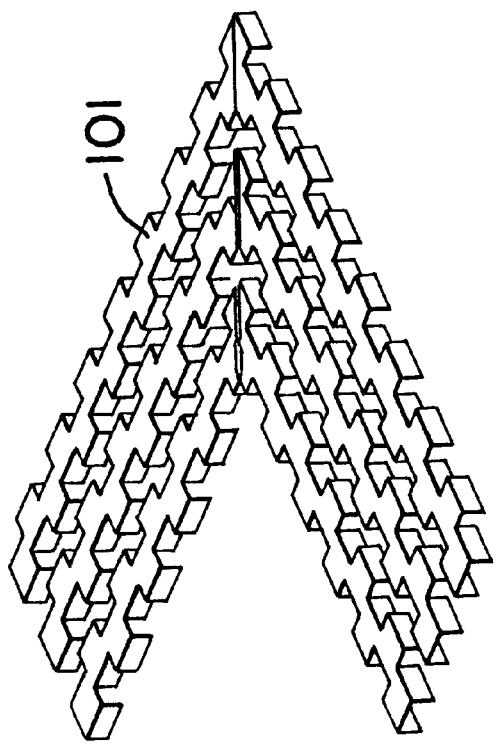
FIGS. 4 and 5 show exploded views of two areas of the fuel reformer of FIG. 3.

As seen in FIG. 3, the fuel reformer 21 comprises a layer or plate of corrugated sheet metal 101. Expanded views of the areas A and B of the plate 101 are shown in FIGS. 5 and 4, respectively.

Figure 4:
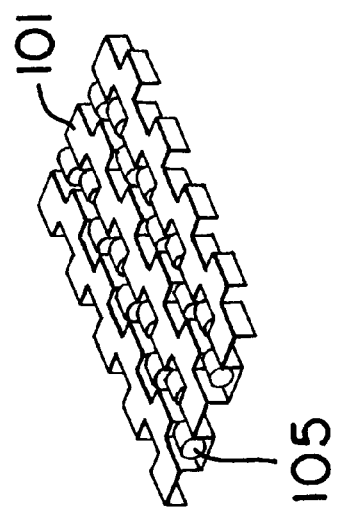

As seen in FIG. 4, catalyst pellets 105 are strategically placed in the corrugations of the plate 101. This placement optimizes the endothermic reforming reaction profile in order to minimize the thermal gradient within the fuel cell stack.

The plate 101 is fitted with a baffle 102 to direct flow within the reformer 21 as shown by the arrows 104, i.e., so that the fuel entering the inlet port 21A undergoes a U-type flow path through the plate 101, and is directed to the outlet port 21B.

The loading of the catalyst 105 and the arrangement of the baffle 102 in the reformer 21 are such that the reforming reaction profile within the reformer matches the fuel cell heat production profile. The fuel mixture is introduced with a high velocity at the inlet port 21A of the reformer and the kinetic energy in the fuel mixture stream provides the necessary energy to turn the flow around in the U-type path. The reformed gas thus exits at the exit port 21B, which is on the same side of the reformer as the inlet port 21A.

In the present illustrative embodiment of the invention, the fuel inlet port 21A of the reformer 21 is rectangular. Each feed line section 82, in turn, is provided with a fan-like transition duct 84 which connects the rectangular inlet port 21A with the end of the round tube forming the feed line section 82.

As can be seen in detail in FIG. 2, each duct 84 is made of two sheet metal halves 84A and 84B to facilitate assembly. The duct includes a joint 84C at its connection to the feed line section to provide a rotational movement which is needed to accommodate changes in stack height.

Figure 6:
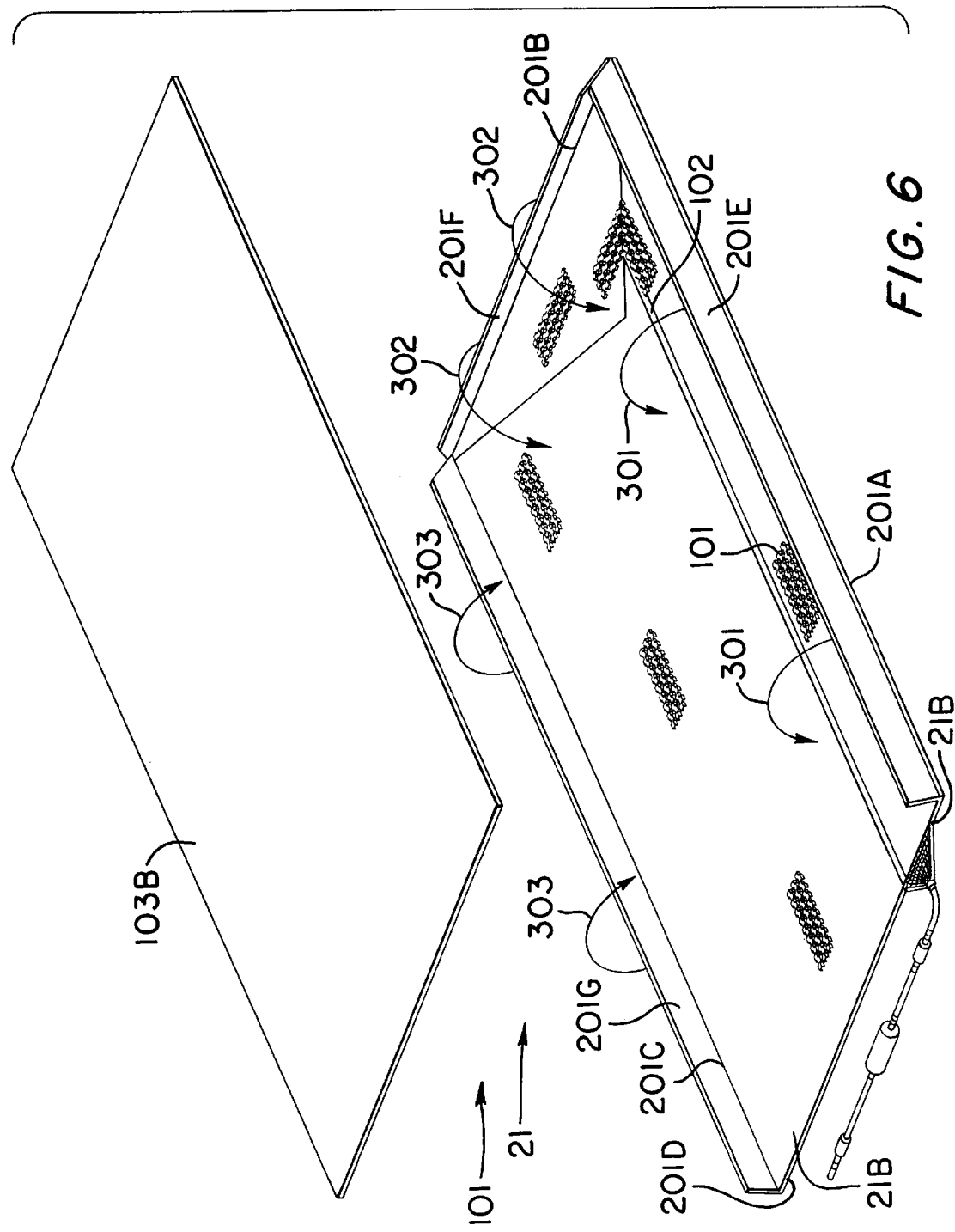
FIG. 6 shows the reformer of FIG. 3 in partially disassembled form.

As shown in FIG. 6, the corrugated plate 101 of the reformer 21 is wrapped in a thin metallic foil 103A (e.g., a nickel foil of two to four mils. thickness) covered by a cover member 103B (e.g., nickel or nickel clad stainless steel material of 2 to 12 mils. thickness) to form a reformer structure. This structure is closed on three sides and open on one side where the fuel inlet port 21A and fuel outlet port 21B are formed. As mentioned previously, the fuel mixture is fed to the fuel inlet port 21A and partially reformed fuel discharged from the reformed fuel outlet port 21B.

In FIG. 6, the reformer 21 is in partially disassembled form in which the foil member 103A and cover member 103B are separated from each other. The foil member 103A has a central region 201 having sides 201A, 201B, 201C and 201D. Three flap regions 201E, 201F and 201G extend from the sides 201A through 201C, respectively. As shown, the flap regions 201E, 201F and 201G are trapezoidal in shape. Additionally, each of the flap regions of 201E and 201G has a rectangular shape at its open side.

In assembling the reformer, the corrugated plate 101 and baffle 102 are situated on the central region 201 of the foil member 103A. The flap regions 201E, 201F, 201G are then folded over as indicated by the arrows 301–303 so that they face the central region 201 and abut the sides of corrugated plate 101.

The cover member 103B is then laid over the central region 201 and the flap regions 201E, 201F and 201G contacting these regions and the baffle 102. Due to compression, the two flap regions 201E and 201G then become sealed to the flap region 201F and the cover member 103B becomes sealed to the three flap regions 201E, 201F, 201G to form the reformer. The space between the central region 201 of the foil member 103A and the cover member 103B defines the open side 201D of the reformer.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A fuel cell assembly comprising:

fuel cells, said fuel cells have oxidant gas inlet ports and fuel inlet ports and being adapted to internally reforming hydrocarbon fuel to fuel gas;

at least one fuel reformer, each said fuel reformer having a fuel inlet port and a reformed fuel outlet port and being adapted to reform hydrocarbon fuel to fuel gas;

said fuel cells and each said fuel reformer being arranged in a fuel cell stack such that said fuel inlet ports of said fuel cells are at a first face of said fuel cell stack, and said fuel inlet ports and said reformed fuel outlet ports of each said reformer are at said first face of said fuel cell stack;

a first manifold for sealingly enclosing the first face of said fuel cell stack;

and a reformer fuel delivery system for delivering fuel to each said reformer, said reformer fuel delivery system being arranged within the sealed region between said first manifold and said first face of said fuel cell stack.

2. A fuel cell assembly in accordance with claim 1 wherein:

said reformer fuel delivery system comprises: a header for receiving a supply of fuel; and at least one fuel feed line, each said fuel feed line being connected to said header and to a fuel reformer.

3. A fuel cell assembly in accordance with claim 2 wherein:

each fuel feed line includes:
a first feed line section connected to said header; a second feed line section spaced from said first feed line section and connected to a fuel reformer; and a dielectric member bridging the space between and connecting said first and second feed line sections.

4. A fuel cell assembly in accordance with claim 3 wherein:

each said dielectric member comprises a dielectric tube having an inner diameter sufficient for said tube to fit over the facing ends of the first and second feed line sections connected by that dielectric member.

5. A fuel cell assembly in accordance with claim 4 wherein:

each said feed line section includes a bellows member.

6. A fuel cell assembly in accordance with claim 3 wherein:

each said reformer includes a metallic material;

said first and second feed line sections include a metallic material; and said dielectric tube includes a ceramic material.

7. A fuel cell assembly in accordance with claim 3 wherein:

the end of each feed line section connected to a fuel reformer includes a fan-shaped end transition.

8. A fuel cell assembly in accordance with claim 6 wherein:

each said fan-shaped end transition includes a rotational joint.

9. A fuel cell assembly in accordance with claim 8 wherein:

the fuel inlet port of each reformer connected to an end of a feed line section is rectangular.

10. A fuel cell assembly in accordance with claim 3 further comprising:

an end plate arranged at the end of said fuel cell stack;

a fuel feed pipe extending through said end plate from a second face of said fuel cell stack and connected to said header.

11. A fuel cell assembly in accordance with claim 3 wherein:

said oxidant gas inlet ports of said fuel cells are arranged at a second face of said fuel cell stack;

said fuel cells have oxidant gas exhaust ports arranged at a third face of said fuel cell stack opposite said second face of said fuel cell stack;

and said fuel cells have fuel exhaust ports arranged at a fourth face of said fuel cell stack opposite said first face of said fuel cell stack.

12. A fuel cell assembly in accordance with claim 11 further comprising:

a second manifold sealingly enclosing said third face of said fuel cell stack; and a third manifold sealingly enclosing said fourth face of said fuel cell stack.

13. A fuel cell assembly in accordance with claim 3 wherein:

each said fuel reformer comprises: a corrugated plate; a foil wrapping said corrugated plate; a cover member forming with said foil wrapping a closed structure having an open side at which are formed the fuel inlet port and reformed fuel outlet port of said reformer; and a baffle situated within said enclosed structure so as to create a U shaped flow path from said fuel inlet port of said reformer to the reformed fuel outlet port of said reformer.

14. A fuel cell assembly in accordance with claim 13 wherein:

said foil wrapping comprises: a foil member having a central region having first, second, third and fourth sides and first, second and third flap regions extending from said first, second and third sides, respectively, of said central region, said flap regions being bent over so as to be adjacent said central region;

and said cover member overlying said central region and said first, second and third flap regions; and said space between said fourth side of said central region of said foil member and said cover member forming the open side of said closed structure.

15. A fuel cell assembly in accordance with claim 14 wherein:

said first and third flap regions seal to said second flap region; and said cover member seals to said first, second and third flap regions.

16. A fuel cell assembly in accordance with claim 15 wherein:

said foil member comprises a nickel foil.

17. A fuel cell assembly in accordance with claim 16 wherein:

said nickel foil has a thickness in the range of 2 to 4 mils.

18. A fuel cell assembly in accordance with claim 1 wherein:

each said fuel reformer comprises: a corrugated plate; a foil wrapping said corrugated plate; a cover member forming with said foil wrapping a closed structure having an open side at which the fuel inlet port and reformed fuel outlet port of said reformer are located; and a baffle situated within said enclosed structure so as to create a U shaped flow path from said fuel inlet port of said reformer to the reformed fuel outlet port of said reformer.

19. A fuel cell assembly in accordance with claim 18 wherein:

said fuel reformer further includes: a catalyst for reforming fuel, said catalyst being supported by the corrugated plate of that reformer.

20. A fuel cell assembly in accordance with claim 18 wherein:

said foil wrapping comprises: a foil member having a central region having first, second, third and fourth sides and first, second and third flap regions extending from said first, second and third sides, respectively, of said central region, said flap regions being bent over so as to be adjacent said central region;

said cover member overlying said central region and said first, second and third flap regions; and said space between said fourth side of said central region of said foil member and said cover member forming the open side of said closed structure.

21. A fuel cell assembly in accordance with claim 20 wherein:

said first and third flap regions seal to said second flap region; and said cover member seals to said first, second and third flap regions.

22. A fuel cell assembly in accordance with claim 21 wherein:

said foil member comprises a nickel foil.

23. A fuel cell assembly in accordance with claim 22 wherein:

said nickel foil has a thickness in the range of 2 to 4 mils; and said cover member comprises nickel and has a thickness in the range of 2 to 12 mils.

24. A fuel cell assembly in accordance with claim 1 wherein:

said reformer delivery system includes:

a first part connected to a reformer; a second part for receiving fuel; a member for electrically isolating said first and second parts.

25. A fuel cell assembly in accordance with claim 24 wherein:

said reformer delivery system further includes:

a header connected to said first part for delivering fuel to said first part.

26. A method for use with a fuel cell assembly, the fuel cell assembly including: fuel cells, said fuel cells have oxidant gas inlet ports and fuel inlet ports and being adapted to internally reforming hydrocarbon fuel to fuel gas; at least one fuel reformer, each said fuel reformer having a fuel inlet port and a reformed fuel outlet port and being adapted to reform hydrocarbon fuel to fuel gas; said fuel cells and each said fuel reformer being arranged in a fuel cell stack such that said fuel inlet ports of said fuel cells are at a first face of said fuel cell stack, and said fuel inlet ports and said reformed fuel outlet ports of each said reformer are at said first face of said fuel cell stack; a first manifold for sealingly enclosing the first face of said fuel cell stack; and a reformer fuel delivery system for delivering fuel to each said reformer, said reformer fuel delivery system being arranged within the sealed region between said first manifold and said first face of said fuel cell stack; the method comprising:

providing a fuel at a temperature below the operating temperature of the fuel cells of said fuel cell stack;

and supplying said fuel to said reformer fuel delivery system to preheat said fuel before delivery to said fuel cells of said fuel cell stack to increase the temperature of said fuel to the operating temperature of said fuel cells of said fuel cell stack.

27. The method in accordance with claim 26 wherein:

said operating temperature said fuel cells of said fuel cell stack is in the range of 540° C. to 650° C.; and the fuel is supplied at a temperature in the range of 490° C. to 540° C.

28. A fuel reformer comprising:

a corrugated plate; a foil wrapping said corrugated plate; a cover member forming with said foil wrapping an enclosure having an open side at which the fuel inlet port and reformed fuel outlet port of said reformer are formed; a baffle situated within said enclosure so as to create a U shaped flow path from said fuel inlet port of said reformer to the reformed fuel outlet port of said reformer; and a catalyst for reforming fuel situated in said enclosure.

29. A fuel reformer in accordance with claim 28 wherein:

said catalyst is supported by the corrugated plate.

30. A fuel reformer in accordance with claim 28 wherein:

said foil wrapping comprises: a foil member having a central region having first, second, third and fourth sides and first, second and third flap regions extending from said first, second and third sides, respectively, of said central region, said flap regions being bent over so as to be adjacent said central region; a cover member overlying said central region and said first, second and third flap regions; and said space between said fourth side of said central region of said foil member and said cover member forming the open side of said closed structure.

31. A fuel reformer in accordance with claim 30 wherein:

said first and third flap regions seal to said second flap region; and said cover member seals to said first, second and third flap regions.

32. A fuel reformer in accordance with claim 30 wherein:

said foil member comprises a nickel foil.

33. A fuel reformer in accordance with claim 32 wherein:

said nickel foil has a thickness in the range of 2 to 4 mils; and said cover member comprises nickel and has a thickness in the range of 2 to 12 mils.

* * * * *

UNITED STATES PATENT AND TRADEMARK OFFICE
CERTIFICATE OF CORRECTION

PATENT NO. : 6,200,696 B1
DATED : March 13, 2001
INVENTOR(S) : Mohammed Farouque et al.

It is certified that error appears in the above-identified patent and that said Letters Patent is hereby corrected as shown below:

Column 1,
Line 4, delete "STATE" and insert -- STATEMENT --.

Column 2,
Line 11, delete "C." and insert -- C --.

Column 5,
Line 8, delete "C." and insert -- C --.
Line 9, delete "-20" and insert -- ~20 --.
Line 9, delete "C." and insert -- C --.

Signed and Sealed this

Twenty-fourth Day of September, 2002

*Attest:*

JAMES E. ROGAN
*Director of the United States Patent and Trademark Office*

*Attesting Officer*